United States Patent [19]
Norman

[11] 3,763,908
[45] Oct. 9, 1973

[54] AUTOMOBILE COVER

[75] Inventor: Reta R. Norman, Dallas, Tex.

[73] Assignee: The Raymond Lee Organization, Inc., New York, N.Y.; a part interest

[22] Filed: Oct. 27, 1971

[21] Appl. No.: 193,016

[52] U.S. Cl. ............................................ 150/52 K
[51] Int. Cl. ............................................. B60j 11/00
[58] Field of Search .................... 150/52 K; 296/136

[56] References Cited
UNITED STATES PATENTS

| | | | |
|---|---|---|---|
| 2,279,812 | 4/1942 | Bartlett | 150/52 K |
| 2,639,751 | 5/1953 | Flaherty | 150/52 K |
| 2,629,347 | 2/1953 | Wittrien | 150/52 K UX |
| 2,787,311 | 4/1957 | Cohen | 150/52 K |
| 2,803,282 | 8/1957 | Wilcox | 150/52 K |
| 2,716,433 | 8/1955 | Rawlings | 150/52 K |

Primary Examiner—Donald F. Norton
Attorney—Howard I. Podell

[57] ABSTRACT

A protective covering for parked automobiles that covers the automobile upper surfaces, together with extendible flaps which cover the sides of the automobile. The covering is mounted so as to permit air space between the covering and the top and sides of the automobile, and fastens to the automobile body by means of magnetic strips fastened to the covering, and to straps fastened to the covering.

The roof section of the covering is peaked by means of a central support mount so as to expedite drainage of rain or other falling debris.

2 Claims, 8 Drawing Figures

PATENTED OCT 9 1973　　3,763,908
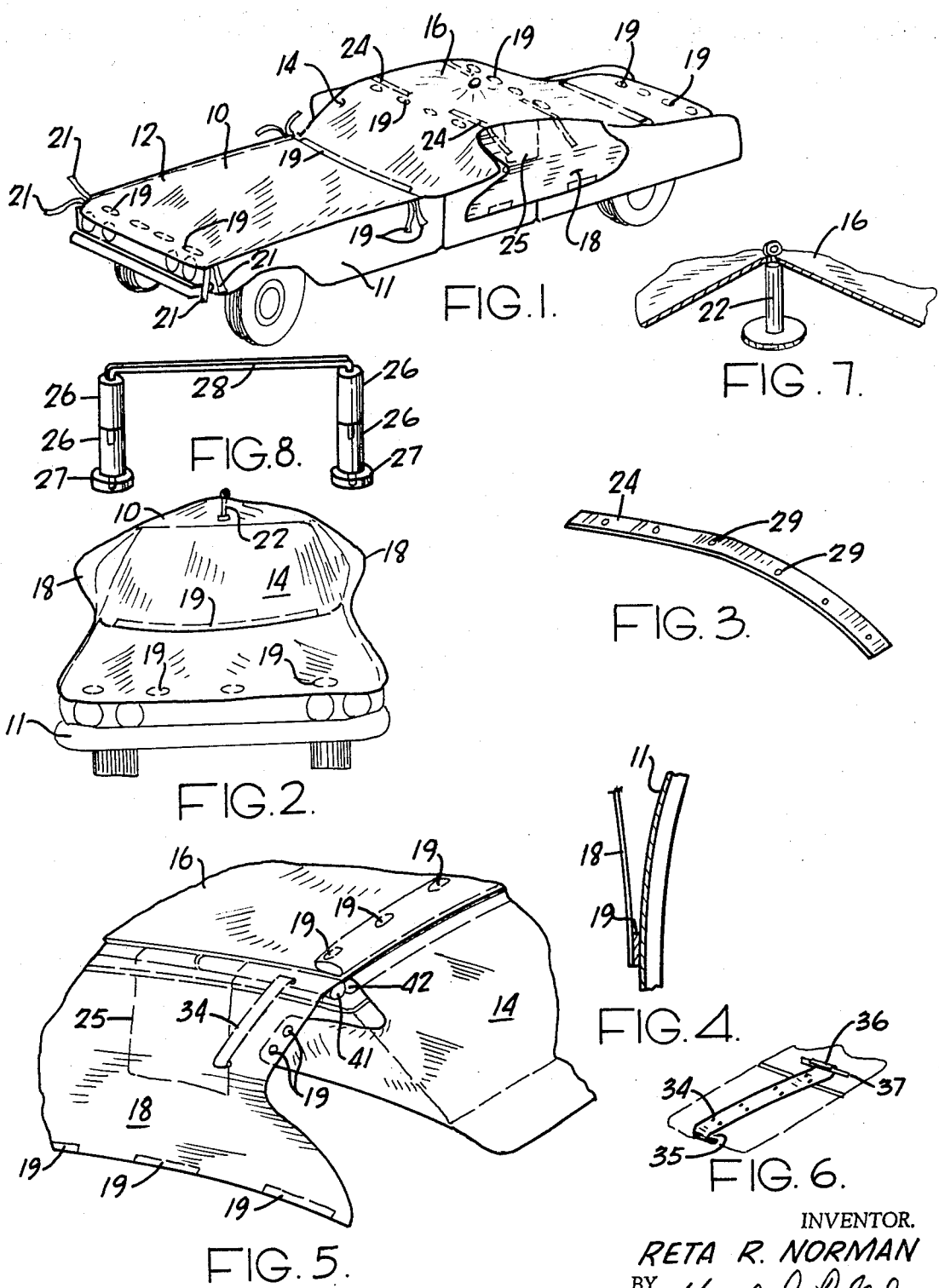
INVENTOR.
RETA R. NORMAN
BY Howard J. Podell
AGENT

AUTOMOBILE COVER

SUMMARY OF THE INVENTION

This invention relates to a protective covering for automobiles parked or stored outdoors.

The covering consists of flexible fabric material which is mounted so as to permit circulation of air between the automobile top and sides, and the covering.

Magnets, permanently mounted in the borders and straps of the covering material, serve to fasten the covering to the automobile body.

The covering over the top of the automobile is supported by a central mount so as to create a peaked surface of the covering to expedite drainage of rain and other debris from the top.

Side flaps are supported by braces extending from the top sides of the cover so as to maintain air circulation between the side flaps and the sides of the automobile.

When disassembled, the several sections comprising the cover may be readily separated from each other by means of snap fasteners permanently fastened to the adjoining borders of each section.

DESCRIPTION OF THE DRAWING

The objects and features of the invention may be understood with reference to the following detailed description of an illustrative embodiment of the invention taken together with the accompanying drawing in which:

FIG. 1 is a perspective view of the covering mounted over an automobile;

FIG. 2 is a front view of the installed covering;

FIG. 3 is an isometric view of a supporting brace for the side section;

FIG. 4 is a fragmentary cross-section of the side of the automobile and the side covering;

FIG. 5 is a fragmentary isometric view of the cover installed over the side and windshield of an automobile;

FIG. 6 is a detail view of a supporting side brace.

FIG. 7 is a detail view of the roof mount; and

FIG. 8 is an elevation view of a collapsable ridge pole assembly which may be employed with the protective covering to form a temporary camping tent.

DESCRIPTION OF THE PREFERRED EMBODIMENT

Turning now descriptively to the drawing, in which similar reference characters denote similar elements throughout the several views, FIG. 1 and FIG. 2 illustrate the covering 10 mounted on automobile 11 with the covering 10 comprising a hood section 12, a windshield section 14, a roof and rear section 16 and side wings 18. The covering 10 is fastened to the car along its borders and at other areas by means of magnets 19 fastened to the covering fabric, and by means of magnetic straps 21 which embody magnets 19. The top section 16 is also fastened to the car by means of an extension flap 25 which may fit inside of and be clamped by the top of the side windows of the automobile.

Roof section 16 is mounted off the top of the automobile by mount 22 located in the center of the car roof as shown in FIG. 7 so as to form a peak to the roof covering section 16 and to furnish insulating air space between the covering and the top of the automobile.

Braces 24 are fastened to the roof section 16 and each side section 18 by means of holes 29 in the braces so as to extend the side wings 18 away from the sides of the automobile. An alternate form of the brace is shown in FIG. 6, brace 34. Brace 34 is attached to the covering fabric but is mounted by hooked section 36 on rod 37 so that the side wings 18 may be folded over roof section 16, when not in use.

FIG. 4 illustrates the manner in which the bottom border of the side wings 18 fasten to the automobile body by means of magnet 19.

FIG. 5 illustrates an alternate embodiment in which the side wings 18 and the windshield section 14 may be wound up on rollers 41 and 42 respectively for storage purposes.

The covering 10 may be used for temporary camping purposes as a leanto or tent by means of collapsible rods 26, and base 27 shown in FIG. 8 which support ridge pole 28, over which the cover 10 may be hung.

Since obvious changes may be made in the specific embodiment of the invention described herein, without departing from the scope thereof, it is indicated that all matter contained herein is intended to be interpreted in an illustrative and not in a limiting sense.

Having thus described my invention, what I claim as new and desire to secure by Letters Patent of the United States is:

1. A protective covering of flexible material for parked automobiles that covers the automobile top surfaces and windshield together with extendable flaps which cover the upper sides of the automobile, said protective covering fastening to the automobile body by means of magnets fastened to the borders of the protective covering, in which straps fastened to the corners of the covering contain embedded magnets to fasten to the automobile body, and in which fastening straps are located along the edges of the top of the covering so as to be clamped by the automobile windows.

2. The device described in claim 1 in which braces mounted on the roof under the covering support the upper portion of the extendable flaps extending from the roof level of the vehicle so as to create air space between the upper sides of the automobile and said extendable flaps.

* * * * *